United States Patent [19]

Firth

[11] 3,847,819
[45] Nov. 12, 1974

[54] SEAL FOR FLUID FILTER
[75] Inventor: Robert L. Firth, Minneapolis, Minn.
[73] Assignee: Donaldson Company, Inc., Minneapolis, Minn.
[22] Filed: Feb. 26, 1973
[21] Appl. No.: 327,738

Related U.S. Application Data
[63] Continuation-in-part of Ser. No. 304,959, Nov. 9, 1972.

[52] U.S. Cl.............. 210/444, 210/131, 210/448, 210/451, 220/46, 277/170
[51] Int. Cl...................... B01d 27/10, F16j 15/48
[58] Field of Search .......... 210/440, 442, 443, 444, 210/448, 450, 451, 452, 131, 133; 220/46; 277/170; 285/113, 334.5

[56] References Cited
UNITED STATES PATENTS
| | | | |
|---|---|---|---|
| 2,287,344 | 6/1942 | Easton et al. | 210/131 |
| 3,289,841 | 12/1966 | Quinting | 210/444 X |
| 2,925,913 | 2/1960 | Wheeler, Jr. | 210/444 X |
| 2,657,807 | 11/1953 | Launder | 210/450 X |
| 2,760,642 | 8/1956 | Wallace | 210/442 |
| 2,305,668 | 12/1942 | Bruno | 285/349 X |

Primary Examiner—Samih N. Zaharna
Assistant Examiner—Robert G. Mukai
Attorney, Agent, or Firm—Merchant, Gould, Smith & Edell

[57] ABSTRACT

A filter housing having a cylindrical main wall portion and an inwardly sloping upper wall portion with an open top and a closed bottom end is provided. A cover member for the housing includes a depending peripheral flange that extends over the sloping upper portion and over part of the main wall portion. A cylindrical filter element is mounted in the housing. An inlet opening in the cover leads to the center of the filter element, and an outlet opening in the cover leads to an annular chamber surrounding the filter element. A flexible O-ring seal is mounted in a sealing chamber formed between the sloping upper wall portion and the cover to seal against fluid leakage between the cover and the housing.

3 Claims, 6 Drawing Figures

PATENTED NOV 12 1974 3,847,819

SEAL FOR FLUID FILTER

CROSS-REFERENCE TO RELATED APPLICATION

This application is a continuation-in-part of my co-pending U.S. application Ser. No. 304,959 filed Nov. 9, 1972.

BACKGROUND OF THE INVENTION

1. Field of the Invention

This invention relates generally to seals for pressure vessels and more particularly relates to an improved sealing system for fluid filters.

2. Description of the Prior Art

Fluid filters of the type shown herein are commonly used to filter fluids such as oil, as for example in hydraulically operated systems. These fluid filters usually have a cylindrical filter housing and a cover providing inlet and outlet openings for the fluid. Some form of seal is provided between the cover and the housing to prevent leakage of the fluid. These systems typically operate under relatively high pressures so that having an effective seal is highly important.

In most prior art fluid filters of which I am aware, some form of rubber ring or the like has normally been placed between the cover and the housing to provide the necessary seal. Three types of prior art sealing systems are shown in FIGS. 4, 5, and 6 of the present application. The system shown in FIG. 4 is perhaps the most popular prior art system. In that system, the cover and housing are tightly clamped together to form a seal between the flat rubber ring and the upper edge of the housing. A problem with this prior art system is that if the pressure exceeds a certain level, the cover and housing will separate, permitting leakage between the rubber ring and the top edge. Because of this problem, the cover and housing of FIG. 4 must be very tightly clamped together. The likelihood of this problem occurring increases as the rubber ages and loses its flexibility.

In the prior art system of FIG. 5, the cover has a depending peripheral flange which supports the upper end of the housing, and the seal is located therebetween. This provides a highly effective seal because as the pressure within the vessel increases, the seal becomes tighter. One problem with the system of FIG. 5 is that when the housing is inserted in the cover, the top edge of the housing will often damage the seal. If the top edge of the housing happens to be sharp, it can actually cut off a portion of the seal.

The system shown in FIG. 6 is similar to that shown in FIG. 5 except that the cover flange is located inside of the cylindrical housing rather than outside. In this system, damage can also be caused to the seal when the cover is inserted into the housing. Another problem is that as the pressure increases inside the housing, it tends to expand, thus loosening the seal between the cover and the housing. Of course, the system of FIG. 6 would provide a tight seal if the system operated at less than atmospheric pressure within the housing. However, it will not provide a good seal under both high pressure and high vacuum conditions.

In order to increase the sealing effect as pressure increases, certain prior art devices have utilized mating flanges defining an annular recess having a wedge shape. A rubber ring placed in the wedge-shaped recess will tend to be forced more tightly into the downstream apex of the recess as pressure increases to thus increase the sealing action. An example of this type of prior art system is shown in the Warman U.S. Pat. No. 3,421,652 issued Jan. 14, 1969. A problem with the Warman device, however, is that if the downstream gap opens, the O-ring will be forced into the gap as the pressure increases. Then, when the pressure decreases, the gap will close and clip off or damage the portion of the O-ring that protrudes into the gap. In order to avoid this problem, Warman utilizes a very heavy, tight-fitting clamp. A somewhat similar device is shown in the Church U.S. Pat. No. 1,603,903 issued Oct. 19, 1926. Because of the heavy clamping requirements, these two prior art devices are not well suited to a fluid filter system in which the filter element must be periodically replaced.

SUMMARY OF THE INVENTION

In the present invention, a heavy head casting is joined with a filter housing made of considerably lighter material. The head casting has a downwardly depending peripheral flange that supports the open end of the filter housing and it prevents it from expanding outwardly under pressure. The upper end of the filter housing has an inwardly sloping wall portion that is covered by the depending cover flange. The cover bottom, the depending flange, and the sloping wall portion of the housing define an annular sealing chamber which is generally triangular in cross section. A flexible, rubber O-ring seal is mounted in the sealing chamber. The diameter of the O-ring seal is such that under normal conditions it contacts all three sides of the triangular chamber.

The structure of the present invention has a number of advantages over the prior art structures. The depending flange of the relatively heavy head casting extends downwardly beyond the sealing chamber over a part of the main cylindrical wall portion of the housing. Therefore, as pressure increases within the housing, the lighter housing expands outwardly for a tighter fit against the cover flange. At the same time, pressure within the housing acts against the inner surface of the O-ring seal to force it tightly into the wedge-shaped portion of the sealing chamber formed by the depending flange and the sloping wall portion of the housing. The greater the pressure, the more tightly the O-ring seal is forced into this wedge-shaped portion of the sealing chamber. The prior art fluid filter constructions of the types shown in FIGS. 4, 5, and 6 of the drawing are normally rated for a maximum pressure of 150 p.s.i. In pressure vessels of similar size utilizing the present invention, however, considerably higher pressure can be permitted. For example, a typical fluid filter employing the present invention may have a commercial maximum pressure rating of 500 p.s.i. Even at these high pressures, it is not necessary to apply heavy clamping pressure to the cover and housing. With the present invention, it is sufficient to tighten the clamping nut by hand.

The present invention also avoids a number of other potential problems. Because the upper edge of the housing does not engage the O-ring seal, there is no danger that the seal will be damaged when the cover is inserted over the housing, as with the prior art devices shown in FIGS. 5 and 6. The problem previously discussed with respect to the Warman device is also avoided, because a pressure increase does not result in a gap being formed between the depending flange and the cylindrical housing. In the present invention, pressure within the housing acts both outwardly and longitudinally. The outward pressure tends to force the housing more tightly against the depending flange to increase the seal. Longitudinal pressure being applied to the O-ring tends to wedge the O-ring more tightly into the bottom portion of the chamber to again increase the sealing effect. Another advantage of the present invention is that the system will seal in both directions. Thus, if the interior of the filter is operating at less than atmospheric pressure, the O-ring seal will be forced into the upper wedge-shaped portion of the sealing chamber to again provide an effective seal. Thus, the same structure can be used to seal in either direction. Because of its unique construction, the fluid filter of the present invention provides a good seal at either high or low pressures, without employing heavier materials than those being presently used in similar fluid filters, without requiring any additional clamping force, and without causing any damage to the O-ring itself.

DESCRIPTION OF THE PREFERRED EMBODIMENT

Figure 1:
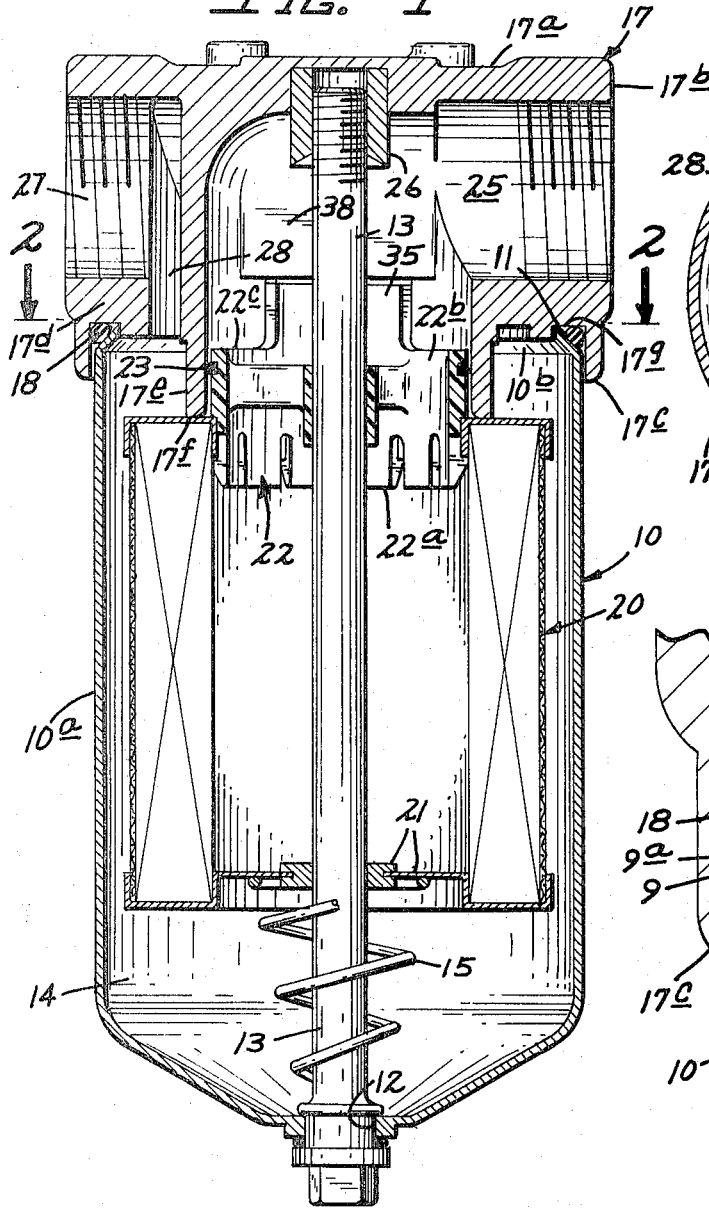
FIG. 1 is an axial sectional view of a preferred embodiment of the fluid filter of the present invention.
Figure 2:
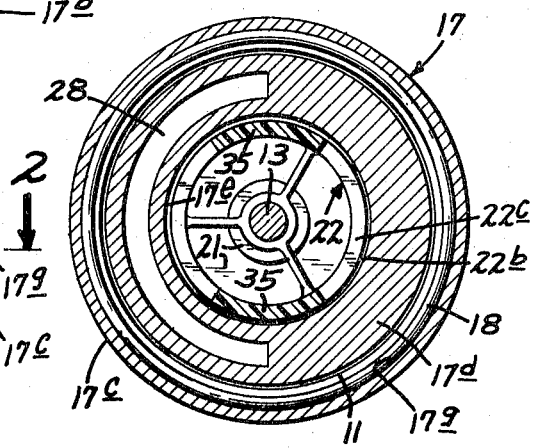
FIG. 2 is a transverse cross sectional view of the filter, taken along line 2—2 of FIG. 1.

Referring now to the drawings, wherein like reference numerals are used throughout the several views to indicate like elements of the invention, there is disclosed in FIG. 1 an oil filter having a generally cylindrical filter housing 10 having an open top end terminating in a circular edge 11 lying in a horizontal plane. The bottom end of housing 10 is closed off except for an axial opening 12 through which a mounting rod 13 extends. Housing 10 defines a filter chamber 14 through which rod 13 extends coaxial with housing 10. Rod 13 has a threaded top end portion which extends above the plane of circular edge 11. A coil spring 15 is mounted around rod 13 adjacent the bottom end of housing 10.

A dome-like cover member 17 is provided having a generaly flat, horizontally extending top wall 17a with side walls generally designated 17b extending downwardly therefrom. The bottom of cover member 17 is provided with a depending, cylinderlike peripheral flange portion 17c which fits snugly over the top end of housing 10. The bottom portion of cover member 17 further includes a bottom web portion 17d extending horizontally inwardly from the top of cylinder-like flange portion 17c, and a coaxially positioned, cylindrical or tubular guide portion 17e connected to the web portion 17d. In the embodiment shown, guide portion 17e extends a short distance downwardly into filter chamber 14 below the plane of circular edge 11. Guide portion 17e terminates in a bottom edge 17f which is circular and which lies in a horizontal plane. Formed in the bottom of web portion 17d adjacent outer flange portion 17c is an annular groove 17g into which the inwardly turned upper edge 11 of housing 10 extends. A circular O-ring 18 is mounted in the groove 17g between the housing 10 and the cover 17 to provide an oil seal.

A cylindrical pleated filter element 20 is mounted in the filter chamber 14, around rod 13, coaxially therewith, between spring 15 and the bottom edge 17f of guide portion 17e. The top end of the filter element 20 engages the bottom edge 17f and is normally held tightly thereagainst by spring 15 to prevent oil flow therebetween. The bottom end of filter element 20 is provided with a disk-like closure member 21 secured thereto with an axial opening thereof slidably mounted on rod 13. The bottom side of closure member 21 engages the top end of spring 15. Thus, filter element 20 is yieldingly biased upwardly against guide portion 17e.

A tubular bypass member 22 has a lower end portion 22a thereof extending into and engaging the upper open end of the filter element 20. An upper end portion 22b thereof slidably extends into the axial or central opening of guide portion 17e. A flexible O-ring type seal 23 is positioned between bypass member 22 and guide portion 17e to prevent fluid flow therebetween.

Cover member 17 is provided with a somewhat L-shaped fluid inlet passageway 25 which leads from an opening in an outer side wall 17b, where the passageway is threaded, to the center of the cover member 17 and thence downwardly to smoothly join the interior opening of guide portion 17e. Mounted in the top wall of passageway 25, coaxially with the housing 10, is a threaded anchor member 26 into which the threaded top end of rod 13 extends to securely hold cover member 17 on housing 10.

A fluid outlet passageway 27 is provided in cover member 17 which leads from an opening in a side wall 17b which is again threaded, through an arcuate opening 28 in web portion 17d into filter chamber 14. Opening 28 actually leads to an annular chamber which lies between housing 10 and filter element 20.

Fluid to be filtered thus enters through inlet passageway 25 and is carried by the L-shaped passageway downwardly through bypass member 22 into the interior of filter element 20. The fluid passes outwardly through the filter element into the outer part of the filter chamber 14 and then flows upwardly through the opening 28 out through outlet passageway 27.

In the embodiment shown, the inlet and outlet passageways 25 and 27 are directly opposite each other in the side walls of the cover member 17. The other two side walls of the cover member 17 are provided with viewing windows (not shown).

Extending upwardly from bypass member 22 are a pair of oppositely disposed tabs 35, which are normally positioned behind the windows. In the preferred embodiment, bypass member 22 and tabs 35 are integrally molded from a plastic material which carries a green pigment. Under normal fluid flow conditions, the two tabs 35 are positioned behind the windows for visual observation, the green color indicating a normal filter condition.

If the filter element 20 should become clogged with foreign material, the pressure inside the filter element will increase, and will act against the bottom closure member 21 causing it to move downwardly against spring 15, carrying filter element 20 therewith. Filter element 20 moves downwardly carrying bypass member 22 therewith. When the upper edge 22c of bypass member 22 passes below the bottom edge 17f of guide portion 17e, oil is permitted to flow therebetween directly from the axial opening in guide portion 17e to the outlet opening 28. Thus, under bypass conditions, the filter element 20 is entirely outside the flow path. For this reason, material collected on the inside of the filter is not disturbed or carried away by the bypass flow. In the bypass condition, the two upwardly extending tabs 35 are carried downwardly so that they are no longer fully visible through the windows.

Formed in the passageway 25 directly opposite each tab 35 from its viewing window are walls 38 which define pockets around the tabs. The walls 38 are parallel to each other and are connected at their opposite vertical side edges to the interior walls of the otherwise circular chamber. The two pockets thus defined are entirely closed except for the bottom openings into which the upwardly extending tabs 35 extend. The pockets thus form air pockets to resist entry of fluid therein. Because air is trapped in the pockets, oil is prevented from flowing upwardly into the pockets to obscure vision. Preferably, the surfaces of the walls 38 which lie directly behind the two tabs are painted a bright color such as red which becomes clearly visible when the tab moves downwardly under the bypass condition.

To service the filter, the rod 13 is unscrewed from the cover member 17 so that the housing 10 can be detached from the cover. The filter element 20 can then be cleaned or replaced. A desirable feature of the structure shown is that under bypass conditions, the dirty oil side of the filter element 20 is out of the oil flow path. This prevents the oil from recapturing the earlier removed foreign material under bypass conditions.

The present structure can be utilized in a wide range of flow applications because the bypass member 22 is an element which is separate from the other elements forming the filter. Thus, the amount of bypass flow permitted can be changed by merely providing a bypass member 22 having different sized or shaped bypass openings. The bypass member 22 can easily be converted to no bypass by simply reducing the depth of the cut-away portions between the two indicator tabs 35. With this form of bypass member, there would be no bypass flow, but the movement of the tabs 35 would still clearly indicate clogging of the filter element.

Although the drawings show a preferred form of filter in which the oil flow is from inside/out through the filter element, it is possible to utilize the present invention in a filter wherein the oil flow is from outside/in through the filter element. In that type of alternate structure, the spring would be located within the filter element to hold it in a normally lower position, and the tab would normally be outside of viewing range through the window. Under bypass conditions, the filter element would be forced upwardly and the tab would then become visible through the window. The form of the bypass member would also have to be changed if bypass flow were desired.

Figure 3:
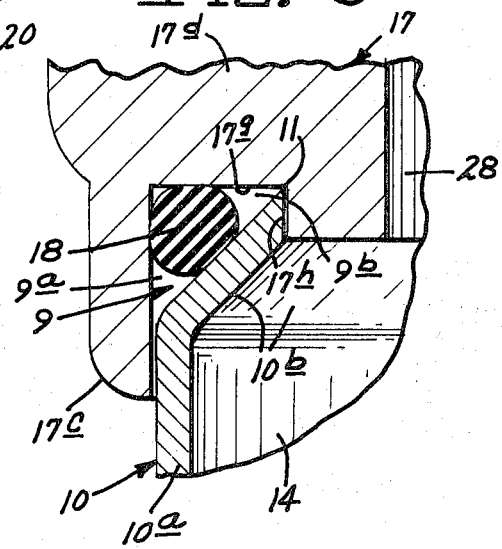
FIG. 3 is an enlarged fragmentary sectional view of the sealing connection shown in FIG. 1.

In FIG. 3, the system for sealing between the cover member 17 and the housing 10 is shown in somewhat enlarged form. The filter housing has a cylindrical main wall portion 10a and an upper, inwardly sloping wall portion 10b terminating in the circular top edge 11, which is smaller in diameter than the diameter of the main wall portion 10a. The inwardly sloping upper wall portion 10b is frusto-conical in shape. The peripheral flange portion 17c of the cover member 17 extends over the sloping wall portion 10b and part of the main wall portion 10a to define an annular sealing chamber 9 between the cover member 17 and the wall portion 10b, which is generally triangular in cross section. Because the flange portion 17c extends downwardly over a part of the cylindrical main wall portion 10a, it provides support for the wall portion 10a as pressure is applied within the filter chamber.

The annular groove 17g formed in web portion 17d has a radial dimension or width corresponding to the difference in diameter between the top opening and the main wall 10a of the housing. The outer peripheral wall of the groove 17g is formed by the depending flange portion 17c. Groove 17g also has a circular inner peripheral wall 17h that is concentric with its outer wall. In the preferred embodiment, the upper edge 11 is formed parallel to and is positioned against the wall 17h. This insures that the housing 10 will remain in a circular condition and will not be bulged inwardly in case outside pressure is applied thereto.

O-ring 18 is preferably made from relatively hard rubber so that it is resilient, but firm. O-ring 18 is mounted in the sealing chamber 9 so that an upper portion thereof is in contact with the upper wall of groove 17g, the outer wall thereof is in contact with the flange portion 17c, and the inside thereof is in contact with the sloping wall portion 10b. The uppermost portion of edge 11 is also in metal-to-metal contact with the upper wall of groove 17g. This metal-to-metal contact provides some sealing, but it is not sufficient to prevent oil from leaking into the sealing chamber 9. As a practical matter, the pressure in chamber 9 between the O-ring 18 and filter chamber 14 is substantially equal. As fluid pressure increases within the chamber 14, the O-ring 18 is forced outwardly and downwardly into the wedge-shaped chamber portion 9a. As the pressure in chamber portion 9b increases, the seal becomes tighter. At the same time, main wall portion 10a is forced more tightly against flange 17c so there is no danger of O-ring 18 being extruded into any gap form therebetween. There is no gap.

The resilient O-ring seal is in contact with its mating sealing surfaces under all conditions of induced pressure or movement. If extremely high pressure within the vessel causes the housing 10 to move longitudinally away from the cover member 17, the O-ring 18 simply rolls with it to maintain the seal.

In case the fluid filter is used in a system wherein the pressure inside the vessel is less than the pressure outside, O-ring 18 would move in the opposite direction into chamber portion 9b to provide the same sealing function.

Figure 4:
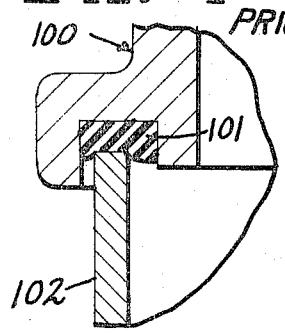
FIGS. 4, 5, and 6 are fragmentary views similar to the view of FIG. 3, showing prior art sealing systems.
Figure 5:
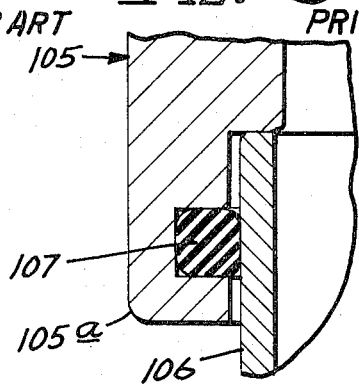
Figure 6:
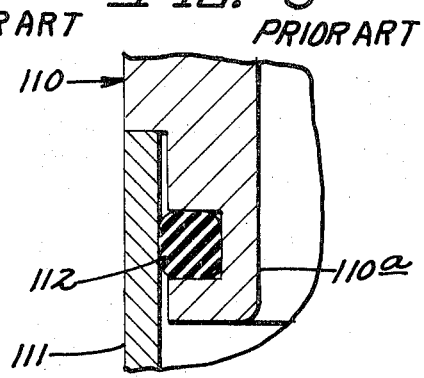

FIGS. 4, 5 and 6 show fragmentary views of prior art oil filter seals, which have been discussed in the introductory portion of the specification. In FIG. 4, the cover 100 carries a flat sealing ring 101, against which the upper edge of the cylindrical housing 102 is clamped. The cover 100 and the housing 102 must be tightly clamped together to provide an effective seal.

In FIG. 5, the cover 105 has a depending flange 105a that extends over the upper end of the cylindrical housing 106. The inner surface of the flange 105a has a groove formed therein carrying an O-ring type seal 107. Although the structure of FIG. 5 provides a tight seal when pressure is applied from within the housing against wall 106, there is always danger than the rubber ring 107 will be damaged when the cover 105 is inserted over the housing 106. This is especially true if the upper edge of the housing 106 is sharp or jagged.

The prior art system shown in FIG. 6 has a cover member 110 with a depending flange 110a that extends into the interior of the cylindrical housing 111. In this case a groove is formed in the outer wall of flange 110a which carries the O-ring seal 112. With this system, damage can be caused to the ring 112 when the cover is inserted into the housing 111. Also, if the pressure increases beyond a certain point within the housing, the housing wall 111 tends to expand away from the ring 112 to permit leakage therebetween.

Although a rubber O-ring has been used in the preferred embodiment of this invention, other forms of circular rubber rings having generally the same configuration can be utilized. As previously indicated, the rubber should be rather firm, but resilient, to withstand the high pressures. It should be noted that although the seal has been described for use in a fluid filter, the same system could be used wherever two conduits or the like have to be connected together in a pressure-tight relationship. Thus, I do not wish to be limited to a seal for fluid filter systems.

What is claimed is:

1. A fluid filter, comprising:
   a. a filter housing of relatively light material susceptible to flexing under pressure having a cylindrical main wall portion, and an inwardly sloping end wall portion terminating in a circular edge defining a circular open end smaller in diameter than the diameter of the main wall portion, and bottom wall means at the opposite end to thereby define a filter chamber;
   b. a non-flexible cover member mounted on the open end, having a annular bottom web portion engaging said circular edge, said cover member having a depending peripheral flange portion that extends over the sloping end wall portion and over part of the main wall portion to define an annular sealing chamber between the cover member and the sloping end wall portion, said sealing chamber being generally triangular in cross-section;
   c. a tubular filter element mounted in said filter chamber;
   d. a first fluid passageway in said cover member leading to the interior of the filter element and a second fluid passageway in said cover member leading to the filter chamber exterior of the filter element;
   e. a flexible, O-ring type seal in said sealing chamber having portions thereof in contact with said cover member and said sloping end wall portion to provide therewith a fluid tight seal between the housing and cover member;
   f. an annular groove formed in said web portion, having an outer peripheral wall formed by the peripheral flange portion, and an inner peripheral wall concentric therewith, said end wall portion having said circular edge positioned in said groove adjacent said inner peripheral wall; and
   g. elongated clamping means connected to the cover member and to the bottom wall means at the opposite end of the housing to hold the cover member on the housing.

2. The apparatus of claim 1 wherein said sloping end wall portion is frusto-conical in shape.

3. The apparatus of claim 1 wherein said elongated clamping means is an axially extending rod attached to said cover member and to said wall means at the opposite end.

* * * * *